No. 625,034. Patented May 16, 1899.
J. E. JACOBS.
AUTOMATIC TIRE PUMP.
(Application filed Mar. 9, 1899.)
(No Model.)
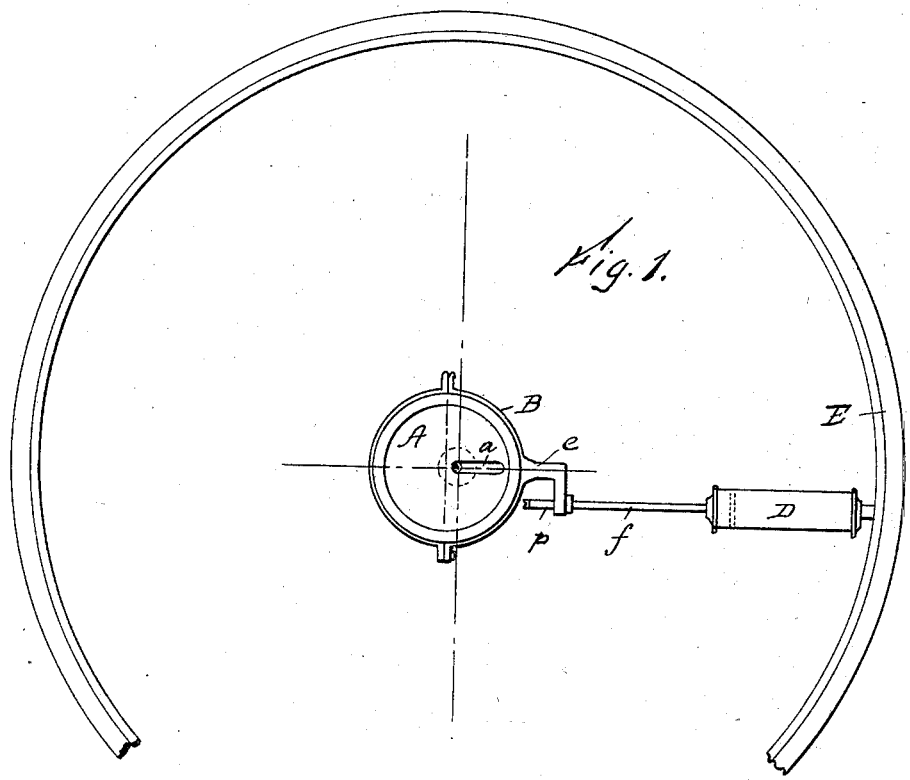
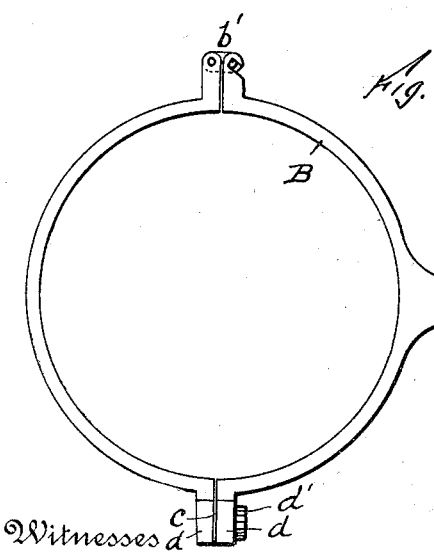
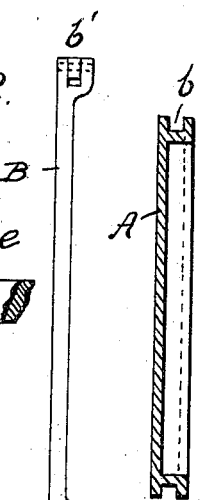
James E. Jacobs, Inventor
Witnesses
A. C. Mellerk
A. A. Gordon.
By Attorney

UNITED STATES PATENT OFFICE.

JAMES E. JACOBS, OF READING, PENNSYLVANIA.

AUTOMATIC TIRE-PUMP.

SPECIFICATION forming part of Letters Patent No. 625,034, dated May 16, 1899.

Application filed March 9, 1899. Serial No. 708,310. (No model.)

*To all whom it may concern:*

Be it known that I, JAMES E. JACOBS, a citizen of the United States, residing at Reading, in the county of Berks and State of Pennsylvania, have invented certain new and useful Improvements in Automatic Tire-Pumps; and I do hereby declare the following to be a full, clear, and exact description of the invention, such as will enable others skilled in the art to which it appertains to make and use the same.

This invention relates to improvements in automatically-operated air-pumps, and is especially adapted for use on bicycles or other like vehicles having inflated tires.

The object of the invention is to produce a pump that will automatically force air into the tire of a bicycle while in motion and by the action of the bicycle.

The invention is fully described in the following specification and clearly illustrated in the accompanying drawings.

Figure 1 is a side view of a portion of a wheel with my apparatus attached thereto. Fig. 2 is the strap in two views. Fig. 3 is the disk in two views.

The disk A is formed with a slot $a$, extending from near its center to near the periphery thereof. This disk is formed with a circumferential groove $b$ around its periphery, in which fits a strap B. This strap B is adapted to hinge at one point $b'$ and to meet at a point $c$ directly opposite, which ends are formed with lugs $d$ and secured by a thumb-screw $d'$. Extending from the one half of this strap is a right-angled arm $e$, to the end of which is secured the plunger $f$ of a pump D. This pump is arranged with its one end inserted in an opening in the tire E of the wheel. The arm $e$ has also a pop-valve $p$ arranged thereon and operated by the plunger $f$. The disk is fastened to the hub of the wheel at any point in the slot $a$, thus giving a long or short stroke to the plunger, as desired.

The operation is as follows: The fact of the cycle-wheel revolving will give an eccentric motion to the disk, which will cause the plunger to operate away from and toward the center of the wheel, and as the pump is stationary on the rim or tire each revolution will cause the pump to force a certain amount of air into the tire. The pump is so arranged that when the pressure in said tire reaches a certain point the relief or pop valve $p$ will operate and prevent any more air being forced into the tire.

Having thus fully described my invention, what I claim, and desire to secure by Letters Patent, is—

In an automatic tire-pump, a circumferentially-grooved disk eccentrically and adjustably attached to the hub of a wheel by means of a slot $a$ therein, a two-piece strap adapted to fit in the groove of said disk, hinged at one point and connected at a point directly opposite by means of a thumb-screw $d'$, said strap having a right-angled arm secured to one piece thereof which is connected to a plunger $f$, said plunger having a piston on its other end operating in a pump D, which pump is inserted in an opening in the tire, all substantially as and for the purpose set forth.

In testimony whereof I affix my signature in presence of two witnesses.

JAMES E. JACOBS.

Witnesses:
 ED. A. KELLY,
 A. C. MELLERT.